United States Patent
Wilson

(10) Patent No.: US 8,469,206 B2
(45) Date of Patent: Jun. 25, 2013

(54) STRAP-ON-HUNTING-HANGER

(76) Inventor: Kyle Marc Wilson, Chippewa Falls, WI (US)

(*) Notice: Subject to any disclaimer, the term of this patent is extended or adjusted under 35 U.S.C. 154(b) by 0 days.

(21) Appl. No.: 12/930,891

(22) Filed: Jan. 20, 2011

(65) Prior Publication Data
US 2012/0119044 A1 May 17, 2012

Related U.S. Application Data
(60) Provisional application No. 61/456,875, filed on Nov. 15, 2010.

(51) Int. Cl.
*A47H 1/00* (2006.01)
(52) U.S. Cl.
USPC ............ 211/100; 211/195; 211/196; 248/324
(58) Field of Classification Search
USPC ............ 248/127, 317, 323, 324, 325; 211/64, 211/70, 85, 85.29, 95, 104, 115, 116, 118, 211/96–102, 171, 1.3, 195–197; 42/94; 124/86
See application file for complete search history.

(56) References Cited

U.S. PATENT DOCUMENTS

| | | | | |
|---|---|---|---|---|
| 5,491,920 A * | 2/1996 | McCullers | ......................... | 42/94 |
| 5,727,760 A * | 3/1998 | Wytovak et al. | ............ | 248/217.3 |
| 5,857,651 A * | 1/1999 | Kunevicius | ................ | 248/230.8 |
| 6,059,240 A * | 5/2000 | Gorsuch | ..................... | 248/219.4 |
| 6,694,661 B1 * | 2/2004 | Langford | ........................... | 42/94 |
| 6,726,163 B2 * | 4/2004 | Eppard et al. | .............. | 248/219.4 |
| 2005/0145436 A1 * | 7/2005 | Prejean | ......................... | 182/136 |
| 2009/0321186 A1 * | 12/2009 | Louchart | ....................... | 182/188 |

* cited by examiner

*Primary Examiner* — Alfred J Wujciak
(74) *Attorney, Agent, or Firm* — The Gray Law Group, Ltd; Steven L. Fisher-Stawinski

(57) ABSTRACT

A hunting equipment rest for use in a tree stand allows the hunter quick access to a weapon, thereby avoiding excess movement. A rigid member is affixed to the tree by a cinch strap. The apparatus is initially positioned such that a first trunk rest, fixed to the rigid member, sits against the tree horizontally, and a second pivoting trunk rest sits against the tree vertically. The second pivoting trunk rest is fixed to a pivot arm. The combination is attached to the rigid member by a pivot pin. The apparatus is locked into place by lowering the pivot arm, which levers the second pivoting trunk rest toward the tree to create tension in the strap. Attached to the pivot arm is a weapon hook, which swivels horizontally. The rest is suitable for a variety of weapons, and is easily installed or removed. The apparatus does not harm the tree.

10 Claims, 4 Drawing Sheets

STRAP-ON-HUNTING-HANGER

CROSS-REFERENCE TO RELATED APPLICATIONS

The application claims priority from Provisional Patent Application Ser. No. 61/456,875 filed on Nov. 15, 2010 by Kyle Marc Wilson, which is incorporated herein by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, TABLE, OR COMPUTER PROGRAM LISTING

Not Applicable

BACKGROUND OF THE INVENTION

The invention relates generally to hunting equipment, and specifically to supports for holding a hunting weapon for quick access while hunting from a tree stand. Hunting weapons, such as bows and rifles, are often heavy, and thus it is fatiguing for the hunter to hold a weapon for long periods of time while lying in wait, for example, in a tree stand. It is preferable, however, for a hunter to avoid large movements associated with readying a weapon when a prey animal comes into view because such large movements can spook the animal.

Accordingly, it is advantageous for a hunter to have a sturdy surface from which to hang or support the weapon. Ideally, a weapon support is adjustable to an optimal position for hanging the weapon in a desired position from which the hunter may easily ready the weapon without causing excess movement. Such a device would be useful not just in the context of tree stand hunting, but in any context where a hanging support from a tree is required, such as hanging a lantern.

BRIEF SUMMARY OF THE INVENTION

Accordingly, the following discloses a weapon hook or support for use in a tree stand. By hanging the weapon within easy reach, the hunter avoids the risk of spooking the game through excess movement caused by the hunter readying the weapon with the game in view. In furtherance of the purpose of assisting in hunting, the invention is designed to be lightweight and easily installed on or removed from a tree.

In the apparatus, a rigid member is affixed to the tree trunk initially by a hand-tightened cinch strap wrapped around the tree trunk to a strap mount, fixedly attached to the rigid member. The apparatus is initially positioned such that a first trunk rest, fixedly attached to the rigid frame, sits against the tree trunk essentially horizontal, and a second pivoting trunk rest sits against the tree essentially vertical. The second pivoting trunk rest is fixedly attached to a pivot arm, and both are together attached to the rigid member by a pivot pin.

The apparatus is locked into place by lowering the pivot arm, which acts as a lever by which the second pivoting trunk rest, in a cam-like motion, is turned to an essentially horizontal position, thereby creating tension in the strap and securing the rigid member to the tree. Attached to the extended end of the pivot arm via a pivot bolt is a weapon support, which swivels in a horizontal plane, and is adjustable to an optimal position for aiming.

The weapon hook is suitable for use with various weapons, including a standard compound bow, rifle, or crossbow, as well as with non-weapon equipment, such as a lantern. In general, what is provided is a tree-mounted support for a hanging or leaned article.

The apparatus, when removed from a tree, is lightweight and may easily be collapsed to fit into a hunter's pack.

It is an object of the invention to provide a stable hook or hanging support for a hunting weapon for use with a hunter's tree stand. The weapon support is used to hold a weapon within easy reach so as to avoid excess movement caused by the hunter readying the weapon.

It is an object of the invention to provide an apparatus that can be used as a hanging or leaning support for any article for which support from a tree is helpful or advantageous.

It is an object of the invention to provide an apparatus that can be quickly installed on and removed from a tree trunk.

It is an object of the invention to provide an apparatus that is lightweight and easy to carry in a hunter's pack.

It is an object of the invention to provide an apparatus that does not harm the tree on which it is installed. In addition to the general value of protecting the environment, this feature may be necessary in certain areas to comply with local laws and regulations that prohibit screwing or drilling into trees.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate only one exemplary embodiment of the invention, and those skilled in the art may be able to devise alternative equivalent embodiments of the invention. The drawings, together with the description, serve to explain the principles of the invention.

In the drawings.

DETAILED DESCRIPTION OF THE INVENTION

Figure 1:
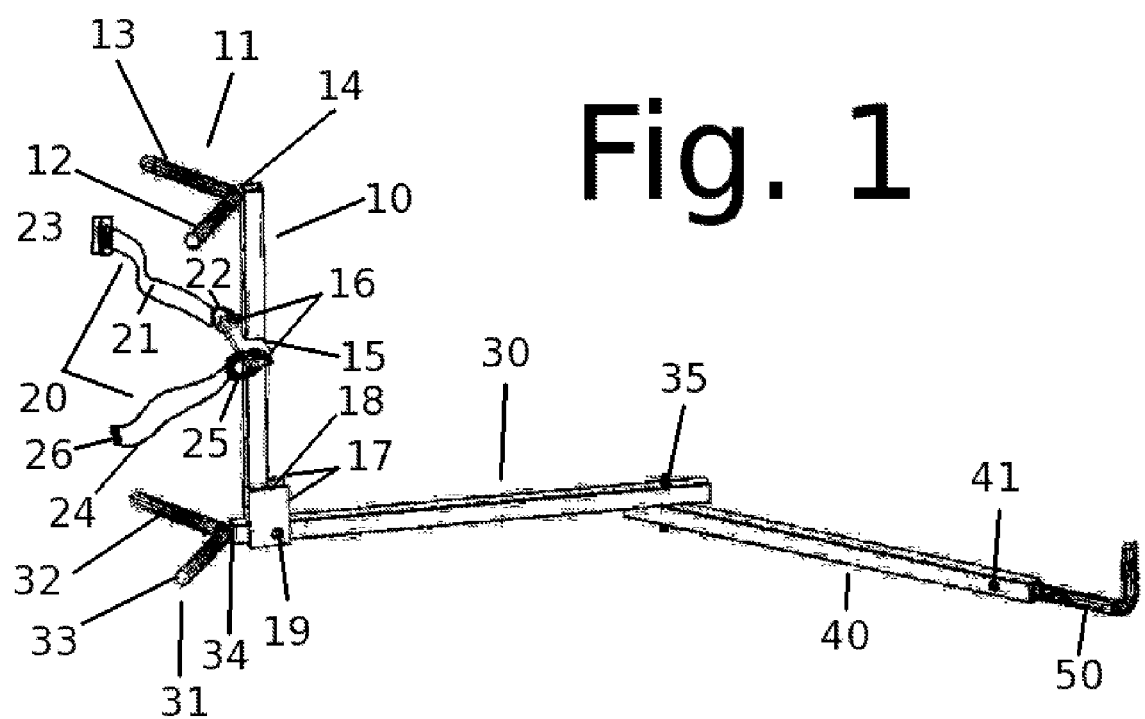
FIG. 1 illustrates the invention in its deployed position.
Figure 2:
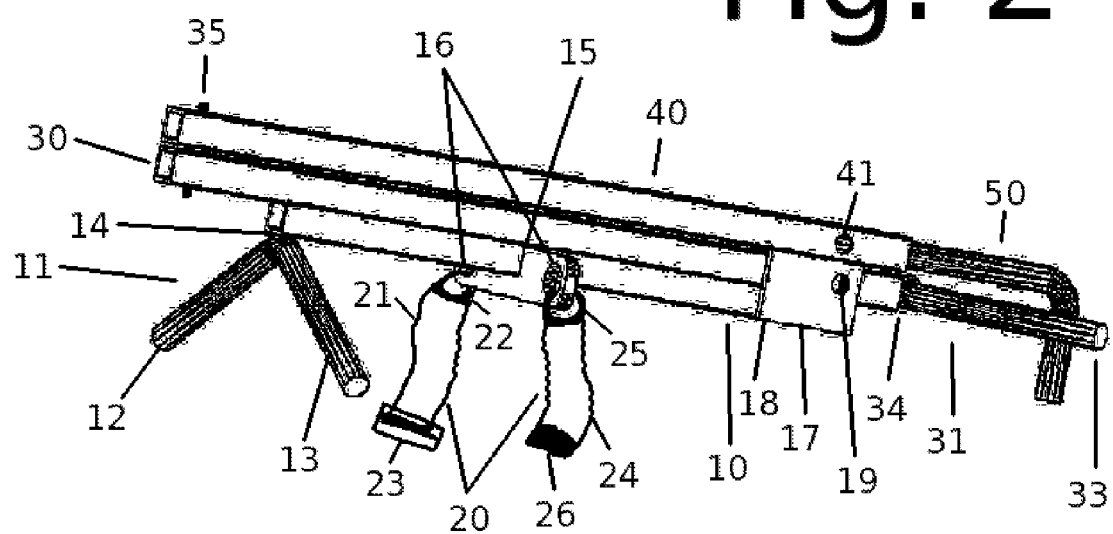
FIG. 2 illustrates the invention in its collapsed storage position.

Referring now to the invention in more detail, FIG. 1 shows an exemplary embodiment of the invention in its unfolded or deployed state, and FIG. 2 shows the same exemplary embodiment of the invention is its folded or collapsed state. In FIG. 1 and FIG. 2, the apparatus embodying the invention is to be mounted vertically against a tree trunk or other mounting surface. In the apparatus, a rigid member 10 to which is rigidly attached, near the vertical top and extending away in the direction of the mounting surface (in FIG. 1, to the left), is a first trunk rest 11, and to which is rigidly attached near the vertical center, a strap mount 15 and cinch strap 20, and also to which is rigidly attached, at the vertical bottom, is a pivot housing 18. Attached to the rigid member 10 via the pivot housing 18 and a pivot pin 19, is a pivot arm 30, to which is rigidly attached, at its first end (in FIG. 1, the left end of 30, and in FIG. 2 the end of 30 at the vertical bottom), is a second pivoting trunk rest 31. At the second end of the pivot arm 30 (in FIG. 1, the right end of 30) is a vertically oriented pivot bolt 35 that attaches a weapon support assembly 40. The weapon support assembly 40 features a hook 50 fixedly attached at a joint 41.

Referring still to the embodiment of FIG. 1 and FIG. 2, and particularly to the rigid member 10, the rigid member 10 is presently envisioned as a square or oblong tube made of steel. Alternatively, other materials and shapes may be used to form the rigid member 10.

At the vertical top of the rigid member 10 is attached the first trunk rest 11, which is shown as comprising a first cylindrical member 12 and a second cylindrical member 13, which are attached at approximately 90° with respect to each other, 90° with respect to the vertical axial line of the rigid member 10, and plus and minus 45° with respect to a line perpendicular to the vertical axial line of the rigid member 10 and passing through the center of the tree trunk. The cylindrical members 12 and 13 are presently envisioned as being circular and solid in cross section and made of steel, however other shapes and materials may be used equivalently. The rigid member 10, first cylindrical member 12, and second cylindrical member 13 meet at a connection point 14, which is presently envisioned as a weld, however equivalent fasteners may be employed to produce a rigid joint.

At the vertical middle of the rigid member 10 is a strap mount 15, which is generally oblong in shape and features a pair of holes 16 through which the ends of the cinch strap 20 are attached. The strap mount is presently envisioned as being made of steel and attached to the rigid member 10 by a weld. Alternative equivalent shapes, materials, and means of attachment of the strap mount 15 may be used. The cinch strap 20 comprises a first piece 21 and a second piece 24. The first piece 21 features at its first end a loop 22 that passes through one of the holes 16 in the strap mount 15, and at its second end a cinch buckle 23. The first piece 21 is presently envisioned as being made of a flexible fabric material; the loop 22 is presently envisioned as being made of a similar fabric material and attached to the strap mount 15 and first piece 21 by sewn stitches; the cinch buckle 23 is presently envisioned as made of a metal or plastic material and attached to the first piece 21 by sewn stitches. The second piece 24 features at its first end a loop 25 that passes through one of the holes 16 in the strap mount 15, and at its second end a reinforced end stitch 26. The second piece 24 is presently envisioned as being made of a flexible fabric material; the loop 25 is presently envisioned as being made of a similar fabric material and attached to the strap mount 15 and second piece 24 by sewn stitches; the reinforced end 26 is presently envisioned as a region of the second piece 24 that is folded over and sewn to itself so as not to degrade when being threaded through the cinch buckle 23.

The cinch strap is used by running the second piece 22 through the buckle 23 and pulling tight, the buckle being constructed such that the second piece 22 will not slip through it. This cinch strap design is well known in the prior art, and is but one example of the many available strap and buckle combinations that may be adapted to the invention.

Attached at the vertical bottom of the rigid member 10 is a pivot housing 18 comprising a pair of thin plate members 17, each attached to one side of the rigid member 10, the particular side being one of the two sides perpendicular to the line of the pivot arm 30. The plate members extend beyond the lower end of the rigid member 10 by at least the width of the pivot arm 30; the plates also extend out from the rigid member 10 in the direction of the line of the pivot arm 30 in part to align the pivot arm 30 in its vertical collapsed position, and in part to allow the pivot pin 19 to be located away from the longitudinal axis of the rigid member 10. The plate members 17 are presently envisioned as being made of steel and attached to the rigid member 10 by a weld, however alternative shapes, materials, and attachment means may be used. Each of the plate members is pierced by a hole through which the pivot pin 19 is passed. The pivot pin 19 attaches the pivot arm 30 by penetrating both of the plate members 17 and the pivot arm 30, which is sandwiched by the plate members 17. The pivot pin 19 may be fixed or loose relative to the rigid member 10; the pivot pin may be removable or non-removable, and is presently envisioned as made of steel, though other materials may be used.

Referring still to the embodiment of FIG. 1 and FIG. 2, and particularly to the pivot arm 30, the pivot arm 30 is shown as a square or oblong tube and is presently envisioned as being made of steel. Alternatively, other materials and shapes may be used to form the pivot arm 30.

At the first end of the pivot arm 30 (in FIG. 1, the left end; in FIG. 2, the vertical bottom end) is attached the second pivoting trunk rest 31, which is shown as comprising a first cylindrical member 32 and a second cylindrical member 33 attached at approximately 90° with respect to each other, and at plus and minus 45° with respect to the axial line of the pivot arm 30. The cylindrical members 32 and 33 are presently envisioned as being circular and solid in cross section and made of steel, however other shapes and materials may be used equivalently. The pivot arm 30, first cylindrical member 32, and second cylindrical member 33 meet at a connection point 34, which is presently envisioned as a weld, however equivalent fasteners may be employed to produce a rigid joint.

At the second end (in FIG. 1, the right end; in FIG. 2, the top end) of the pivot arm 30 is a vertical pivot bolt 35, which passes through holes in the pivot arm 30, and then through holes in the weapon support assembly 40 to create a swivel connection between the pivot arm 30 and the weapon support assembly 40. On the created joint, the weapon support assembly 40 may be swung out in a horizontal plane to any desired position. The vertical pivot bolt 35 is envisioned as being made of steel and may be removable or non-removable from its mounting. Alternative materials and fastening means may be used.

Referring still to the embodiment of FIG. 1 and FIG. 2, and particularly to the weapon support assembly 40, the weapon support assembly 40 is shown as a square or oblong tube and is presently envisioned as being made of steel, however other shapes and materials may be used. The weapon support assembly 40 is connected at its extended end to a weapon hook 50. The weapon hook 50 is presently envisioned as made of cylindrical steel bent 90°, and is attached at a connection point 41, which is presently envisioned as a weld. Alternative shapes, materials, and attachment means for the weapon hook 50 may be used.

Figure 3:
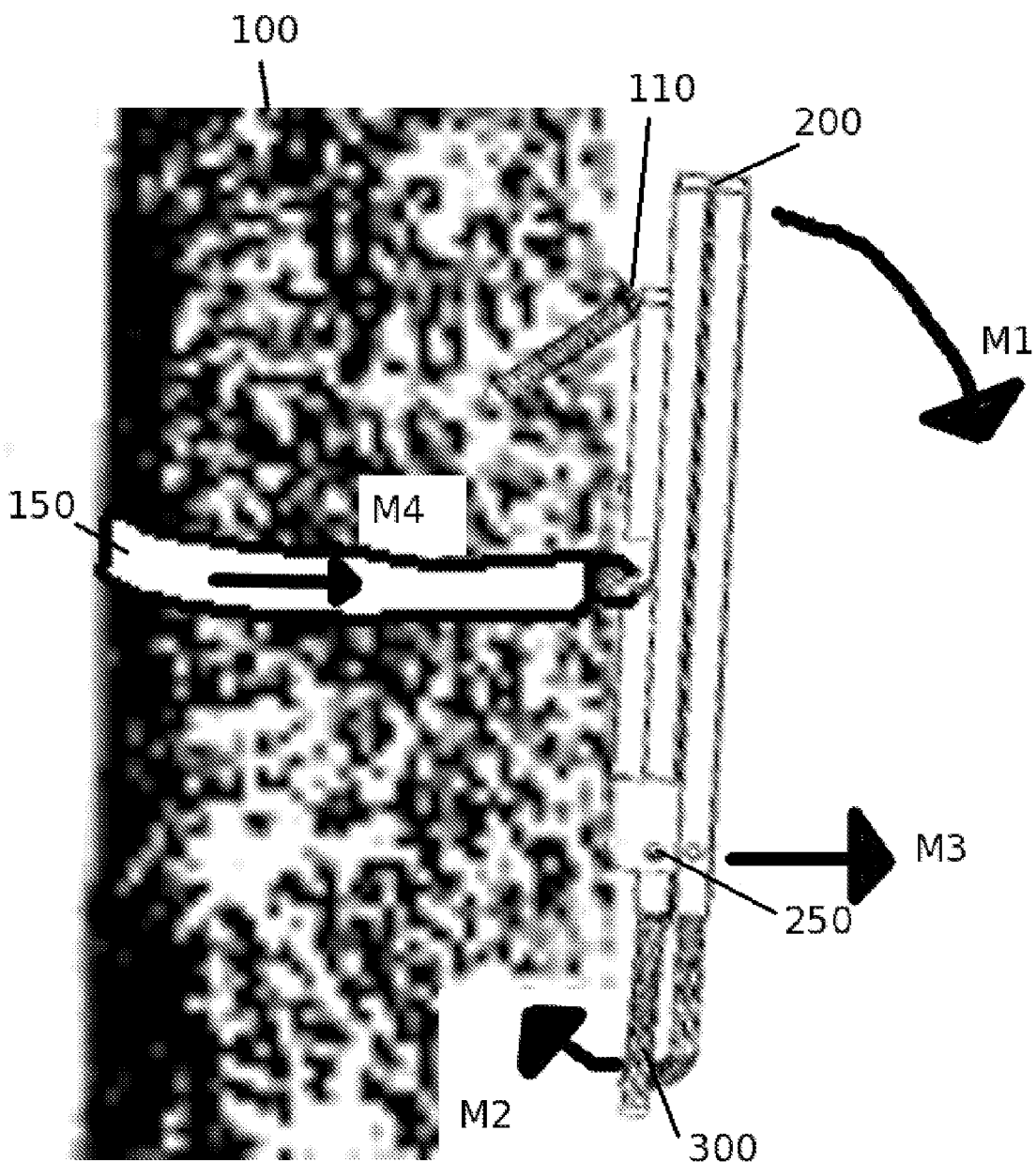
FIG. 3 illustrates the motion of the invention as it is deployed on the trunk of a tree.

Referring now to FIG. 3, which describes the manner in which the apparatus moves during installation as part of its function, in FIG. 3, the apparatus is attached to a tree trunk 100 initially by the user buckling and hand-tightening the cinch strap 150. In this configuration, the apparatus is in its collapsed state with only the first trunk rest 110 against the trunk 100. The second trunk rest 300 is oriented downward, and the pivot arm 200 is oriented vertically.

To lock the apparatus, the user pulls down on the pivot arm 200 in motion M1, causing the pivot arm 200 to rotate about the pivot point 250 and the second trunk rest to move toward a horizontal position in motion M2. As the second trunk rest is pressed against the tree trunk, the rotational motion of the pivot arm is converted, in a cam-like fashion, into linear motion. This linear motion is expressed at the pivot point, which moves out from the tree trunk in motion M3. This linear motion in turn causes motion M4 in the cinch strap 150, thereby creating tension beyond what the user can provide by hand-tightening, and it is the added tension that secures the apparatus to the tree to provide a stable weapon support.

Figure 4:
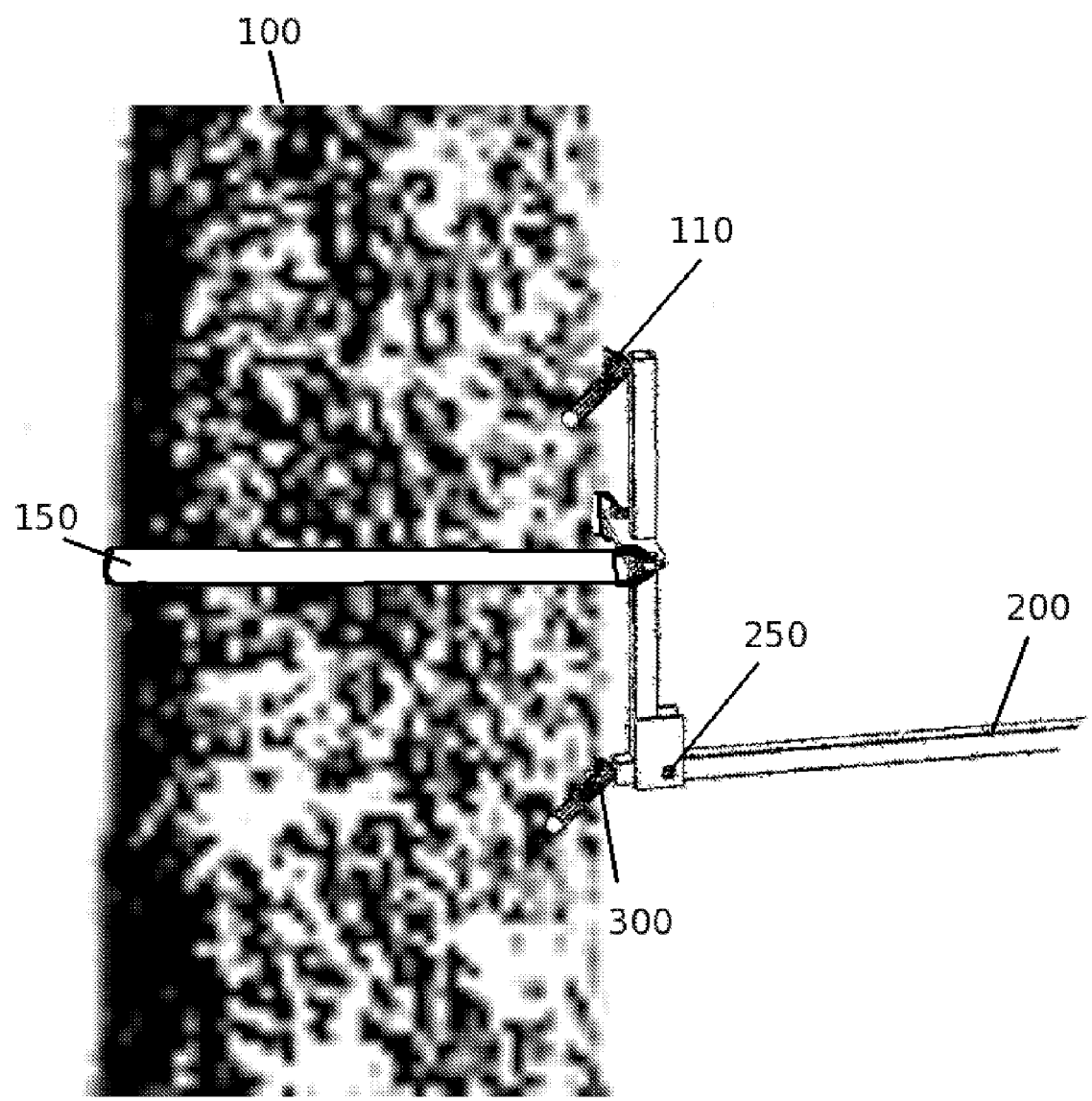
FIG. 4 illustrates the invention deployed on the trunk of a tree.

FIG. 4 shows the resulting configuration in which both the first trunk rest 110 and the second trunk rest 300 are horizontal against the tree trunk 100. The apparatus is held securely in place by the taught cinch strap 150, and the pivot arm 200 is approximately horizontal.

To use the invention in its deployed state, the user rotates the weapon support assembly (now in a horizontal plane with the pivot arm) and hangs the weapon from the weapon hook or leans it against the weapon support assembly. In other contexts, the apparatus may be deployed without a tree stand in order to provide a hanging or leaning support for other articles. For example, the apparatus may be deployed at a camp site without a tree stand in order to provide an overhead hanging support for a lantern. Depending on the context of use, and on the intended weapon or article, the total size of the apparatus and relative size of the components may be adjusted, as needed, to fit different types and sizes of trees and different types, sizes, and weights of hunting weapons.

While the foregoing written description of the invention enables one of ordinary skill in the art to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

What is claimed is:

1. A hanger to be mounted on a mounting surface comprising:
    (a) a first rigid member having a first end and a second end,
    (b) a strap,
    (c) a means for attaching said strap to said first rigid member,
    (d) said means for attaching said strap to said first rigid member being fixedly attached to said first rigid member at a point in between said first end and said second end of said first rigid member,
    (e) said strap being capable of being wrapped around said mounting surface,
    (f) both ends of said strap comprising two separated straps being attached to said means for attaching said strap to said first rigid member,
    (g) at least one end of said strap being capable of being removed from said means for attaching said strap to said mounting surface,
    (h) a first support means for supporting the hanger against said mounting surface,
    (i) said first support means being fixedly attached to said first end of said first rigid member,
    (j) a means for pivotably mounting said first rigid member to a second rigid member,
    (k) said second rigid member having a first end and a second end,
    (l) said second rigid member being pivotably attached to said second end of said first rigid member at a pivot point using said means for pivotably mounting said first rigid member to said second rigid member,
    (m) a second support means for supporting the hanger against said mounting surface,
    (n) said second support means being fixedly attached to said first end of said second rigid member,
    (o) said first and second rigid members being capable of being rotated about said pivot point into a first position such that their axial lines are approximately parallel,
    (p) said first and second rigid members being capable of being rotated about said pivot point into a second position such that their axial lines are approximately perpendicular,
    (q) said first support means is fixedly attached to said first end of said first rigid member at about a 90° angle relative to the axial line of said first rigid member, and
    (r) said first support means contains a first pair of angled members, said first pair of angled members being fixedly attached to each other at about a 90° angle relative to each other, and each at about a 45° angle relative to a line perpendicular to the axial line of said first rigid member,
    whereby, when said hanger is moved from said first position to said second position, said second support means is rotated to apply a force tending to separate said pivot point from said mounting surface, thereby creating tension in said strap at least to the degree necessary for the friction between the mounting surface and said first and second support means to support at least the weight of said hanger and a load.

2. The hanger of claim 1, wherein said pair of angled members are made of cylindrical steel.

3. The hanger of claim 1, wherein:
    (a) said mounting surface is a tree,
    (b) said second support means is fixedly attached to said first end of said second rigid member such that the axial line of said second support means is aligned with the axial line of said second rigid member,
    (c) said second support means contains a second pair of angled members, said second pair of angled members being fixedly attached to each other at about a 90° angle relative to each other, and each at about a 45° angle relative to the axial line of said second rigid member,
    (d) said first and second pairs of angled members are made of cylindrical steel,
    (e) said means for pivotably mounting said first rigid member to a second rigid member contains a pair of plate members, said plate members being mounted on opposite sides of said first rigid member, such that said plate members extend beyond the length and width of said first rigid member to sandwich said second rigid member, a first set of collinear holes penetrating said pair of plate members and said second rigid member, said first set of collinear holes being located at said pivot point, a pivot pin, and said pivot pin penetrating said set of collinear holes, whereby a pivoting joint is created between said first and second rigid members,
    and further including:
    (f) a third rigid member having a first end and a second end, a means for attaching said second rigid member to said third rigid member such that the two rigid members may swivel about the joint, a means for removably securing equipment to said third rigid member, said first end of said third rigid member being attached to said second end of said second rigid member by said means for attaching said second rigid member to said third rigid member such that the two rigid members may swivel about the joint, and said means for removably securing equipment to said third rigid member being fixedly attached to said second end of said third rigid member, whereby said third rigid member may be rotated with respect to said second rigid member to support said load in a position preferred by a human user of said hanger, wherein:

(g) said means for attaching said second rigid member to said third rigid member such that the two rigid members may swivel about the joint contains a second set of collinear holes penetrating said second end of said second rigid member and said first end of said third rigid member, a swivel pin, and said swivel pin penetrating said second set of collinear holes, whereby said second and third rigid members may be swiveled relative to each other about said swivel pin, (h) said means for removably securing equipment to said third rigid member is a hook, whereby said load may be prevented from falling or slipping off from said third rigid member when hung from or leaned upon the same, (i) said hook is made of cylindrical steel bent about 90° to form a hook shape, (j) said first, second, and third rigid members are made of square tube steel, and (k) the several fixed attachments are made by welding.

4. A hanger to be mounted on a mounting surface comprising:

(a) a first rigid member having a first end and a second end,
(b) a strap,
(c) a means for attaching said strap to said first rigid member,
(d) said means for attaching a said strap to said first rigid member being fixedly attached to said first rigid member at a point in between said first end and said second end of said first rigid member,
(e) said strap being capable of being wrapped around said mounting surface,
(f) both ends of said strap comprising two separated straps being attached to said means for attaching said strap to said first rigid member,
(g) at least one end of said strap being capable of being removed from said means for attaching said strap to said mounting surface,
(h) a first support means for supporting the hanger against said mounting surface,
(i) said first support means being fixedly attached to said first end of said first rigid member,
(j) a means for pivotably mounting said first rigid member to a second rigid member,
(k) said second rigid member having a first end and a second end,
(l) said second rigid member being pivotably attached to said second end of said first rigid member at a pivot point using said means for pivotably mounting rigid member to a second rigid member,
(m) a second support means for supporting the hanger against said mounting surface,
(n) said second support means being fixedly attached to said first end of said second rigid member,
(o) said first and second rigid members being capable of being rotated about said pivot point into a first position such that their axial lines are approximately parallel,
(p) said first and second rigid members being capable of being rotated about said pivot point into a second position such that their axial lines are approximately perpendicular,
(q) a pair of plate members,
(r) said plate members being mounted on opposite sides of said first rigid member,
(s) such that said plate members extend beyond the length and width of said first rigid member to sandwich said second rigid member,
(t) a first set of collinear holes penetrating said pair of plate members and said second rigid member,
(u) said first set of collinear holes being located at said pivot point,
(v) a pivot pin, and
(w) said pivot pin penetrating said set of collinear holes, whereby when said hanger is moved from said first position to said second position, said second support means is rotated to apply a force tending to separate said pivot point from said mounting surface, thereby creating tension in said strap at least to the degree necessary for the friction between the mounting surface and said first and second support means to support at least the weight of said hanger and a load, and whereby a pivoting joint is created between said first and second rigid members.

5. A hanger to be mounted on a mounting surface comprising:

(a) a first rigid member having a first end and a second end,
(b) a strap,
(c) a means for attaching said strap said first rigid member,
(d) said means for attaching said strap to said first rigid member being fixedly attached to said first rigid member at a point in between said first end and said second end of said first rigid member,
(e) said strap being capable of being wrapped around said mounting surface,
(f) both ends of said strap comprising two separated straps being attached to said means for attaching said strap to said first rigid member,
(g) at least one end of said strap being capable of being removed from said means for attaching said strap to said mounting surface,
(h) a first support means for supporting the hanger against said mounting surface,
(i) said first support means being fixedly attached to said first end of said first rigid member,
(j) a means for pivotably mounting said first rigid member to a second rigid member,
(k) said second rigid member having a first end and a second end,
(l) said second rigid member being pivotably attached to said second end of said first rigid member at a pivot point using said means for pivotably mounting said first rigid member to a second rigid member,
(m) a second support means for supporting the hanger against said mounting surface,
(n) said second support means being fixedly attached to said first end of said second rigid member,
(o) said first and second rigid members being capable of being rotated about said pivot point into a first position such that their axial lines are approximately parallel,
(p) said first and second rigid members being capable of being rotated about said pivot point into a second position such that their axial lines are approximately perpendicular,
(q) a third rigid member having a first end and a second end,
(r) a means for attaching said second rigid member to said third rigid member such that the two rigid members may swivel about the joint,
(s) a means for removably securing equipment to said third rigid member, (t) said first end of said third rigid member being attached to said second end of said second rigid member by said means for attaching said second rigid member to said third rigid member such that the two rigid members may swivel about the joint, and (u) said means for removably securing equipment to said third rigid member being fixedly attached to said second end of said third rigid member, whereby when said hanger is moved from said first position to said second position, said second support means is rotated to apply a force tending to separate said pivot point from said mounting surface, thereby creating tension in said strap at least to the degree necessary for the friction between the mounting surface and said first and second support means to support at least the weight of said hanger and a load, and whereby said third rigid member may be rotated with respect to said second rigid member to support said load in a position preferred by a human user of said hanger.

6. The hanger of claim 5, wherein said means for attaching said second rigid member to said third rigid member such that the two rigid members may swivel about the joint contains:

(a) a second set of collinear holes penetrating said second end of said second rigid member and said first end of said third rigid member, (b) a swivel pin, and (c) said swivel pin penetrating said second set of collinear holes, whereby said second and third rigid members may be swiveled relative to each other about said swivel pin.

7. The hanger of claim 6, wherein said means for removably securing equipment to said third rigid member is a hook, whereby said load may be prevented from falling or slipping off from said third rigid member when hung from or leaned upon the same.

8. The hanger of claim 7 wherein said hook is made of cylindrical steel bent about 90° to form a hook shape.

9. The hanger of claim 5, wherein said first, second, and third rigid members are made of square tube steel.

10. The hanger of claim 5, wherein the several fixed attachments are made by welding.

* * * * *